United States Patent
Ferguson

(10) Patent No.: US 10,771,276 B2
(45) Date of Patent: Sep. 8, 2020

(54) SYSTEMS, METHODS AND COMPUTER PROGRAM PRODUCTS FOR AGGREGATING BUILDING PERFORMANCE DATA FROM DISSIMILAR SOURCES

(71) Applicant: Brady Trane Service, Inc., Greensboro, NC (US)

(72) Inventor: Joshua Dana Ferguson, Raleigh, NC (US)

(73) Assignee: Brady Trane Service, Inc., Greensboro, NC (US)

( * ) Notice: Subject to any disclaimer, the term of this patent is extended or adjusted under 35 U.S.C. 154(b) by 31 days.

(21) Appl. No.: 16/249,034

(22) Filed: Jan. 16, 2019

(65) Prior Publication Data

US 2020/0228368 A1 Jul. 16, 2020

(51) Int. Cl.
| | |
|---|---|
| *G06F 15/16* | (2006.01) |
| *H04L 12/28* | (2006.01) |
| *H04L 29/06* | (2006.01) |
| *H04L 29/08* | (2006.01) |

(52) U.S. Cl.
CPC ........ *H04L 12/2825* (2013.01); *H04L 67/125* (2013.01); *H04L 67/40* (2013.01)

(58) Field of Classification Search
None
See application file for complete search history.

(56) References Cited

U.S. PATENT DOCUMENTS

| | | | |
|---|---|---|---|
| 9,853,827 B1 | 12/2017 | Goodnow | |
| 2006/0089977 A1* | 4/2006 | Cramer | H04L 29/06 709/218 |
| 2009/0089225 A1* | 4/2009 | Baier | G06Q 10/06 706/12 |
| 2009/0089701 A1* | 4/2009 | Baier | G06Q 10/06 715/772 |
| 2016/0234186 A1 | 8/2016 | Leblond | |
| 2016/0335731 A1 | 11/2016 | Hall | |
| 2017/0357225 A1* | 12/2017 | Asp | G05B 15/02 |
| 2018/0119972 A1 | 5/2018 | Trikha | |
| 2018/0232422 A1* | 8/2018 | Park | G06F 16/22 |
| 2019/0025786 A1* | 1/2019 | Park | G06F 16/2474 |
| 2019/0347000 A1* | 11/2019 | Marsolek | E01C 19/48 |

(Continued)

OTHER PUBLICATIONS

Dawson-Haggerty, S., "Building Operating Systems Services: An Architecture for Programmable Buildings," Technical Report No. UCB/EECS-2014-96, Electrical Engineering and Computer Sciences, University of California at Berkeley, http://www.eecs.berkeley.edu/Pubs/TechRpts/2014/EECS-2014-96.html May 16, 2014, 152 pages.

*Primary Examiner* — Natisha D Cox

(74) *Attorney, Agent, or Firm* — Sage Patent Group

(57) ABSTRACT

Methods of providing building performance data include receiving building performance data from multiple different building performance data sources each comprising one of multiple different system programming languages and configured to provide building performance data at different time intervals, aggregating the received building performance data from the different building performance data sources into a single data stream, generating graphical data that represents data in the single data stream and providing the data in the single data stream and/or the graphical data to be displayed data to a user.

19 Claims, 7 Drawing Sheets

(56) References Cited

U.S. PATENT DOCUMENTS

2019/0361407 A1\* 11/2019 Vogel ............. G06Q 10/063114
2019/0361411 A1\* 11/2019 Park ...................... H04L 41/046
2020/0074832 A1\* 3/2020 Vincent ............. G08B 21/0225
2020/0089174 A1\* 3/2020 Perez ................... G05B 13/041

\* cited by examiner

SYSTEMS, METHODS AND COMPUTER PROGRAM PRODUCTS FOR AGGREGATING BUILDING PERFORMANCE DATA FROM DISSIMILAR SOURCES

BACKGROUND

Various embodiments described herein relate to computer systems, methods and program products, and more particularly to systems, methods and computer program products for aggregating building performance data.

Building management is becoming increasingly important for enterprises. However, it is becoming increasingly difficult to aggregate building performance data that is generated and provided by multiple different systems, sensors and/or types thereof. For example, different systems and/or types thereof may provide data using different protocols. The data from such systems may provide challenges for a site operator and/or user to utilize in a meaningful way. Accordingly, there may be overlaps and gaps among energy and sustainability management use cases within an enterprise.

BRIEF SUMMARY

Some embodiments of the present inventive concept are directed to computer implemented methods of providing building performance data. Such methods may include receiving building performance data from multiple different building performance data sources each comprising one of multiple different system programming language and/or protocols and configured to provide building performance data at different time intervals. Operations may include aggregating the received building performance data from the different building performance data sources into a single data stream, generating graphical data that represents data in the single data stream, and displaying the graphical data to a user.

In some embodiments, receiving building performance data comprises sending, to an analytics and scripting server that is operable to manage a session, session information that includes schedules for running multiple scripts that are designated to be executed at different times and session state information corresponding to an active web session and receiving, from the analytics and scripting server, updates corresponding to the session state information of the active web session.

In some embodiments, receiving building performance data comprises receiving sensor values corresponding to multiple building performance sensors that are communicatively coupled via an Internet of Things (IoT) network and receiving error messages corresponding to ones of the building performance sensors. In some embodiments, receiving building performance data further comprises receiving data updates that have occurred and the sensor values, the error messages and the updates are received in a data stream.

Some embodiments include providing a digital representation of an IoT network that includes the different building performance data sources and storing the digital representation in a database. In some embodiments, the database comprises a virtual database that is hosted on one or more virtual servers.

Some embodiments provide that receiving building performance data comprises sending, to an IoT network, multiple requests for sensor values from multiple building performance sensors. In some embodiments, the requests correspond to multiple different data protocols. Some embodiments include, responsive to sending the requests, receiving, from the IoT network and in a single stream, sensor values from the building performance sensors that are protocol specific and that correspond to the different data protocols. In some embodiments, the digital representation comprises an event-sourced algorithm and is based on an event stream that provides information corresponding to retrospective state conditions of the database that corresponds to a previously occurring point in time.

Some embodiments provide that the digital representation is hierarchical and is configured to include one or more acyclic graphs therein. In some embodiments, the analytics and scripting server communicates with the database via a remote procedure call (RPC) server and the RPC server is further configured to receive queries and send the graphical data in the single data stream to a remote client. Some embodiments provide that sending, to the IoT network, the requests for sensor values from the building performance sensors comprises querying different ones of the building performance sensors at different rates based on predefined priorities corresponding to different ones of the building performance sensors, the different rates comprising different sampling intervals.

Some embodiments provide that a first portion of the building performance sensors comprises a first priority and a second portion of the building performance sensors comprises a second priority that is different from the first priority. In some embodiments, each of the sensors may be queried at different rates. For example, a sensor may be in a 'sleep' state or a 'ready' state depending on whether the sensor is ready to be queried. For example, sensors that are ready may be fed into a queue. Some embodiments provide that the gateway at the other end of the queue may pull from the queue to control system parameters, such as band-width. In some embodiments, querying different ones of the building performance sensors at different rates comprises querying the first portion of the building sensors at a first rate and querying the second portion of the building performance sensors at a second rate that is different from the first rate.

Some embodiments provide that sending, to the IoT network, the requests for sensor values and receiving, from the IoT network the sensor values comprises using an IoT-specific protocol.

In some embodiments, receiving, from the IoT network and in the single stream, sensor values from the building performance sensors that are protocol specific and that correspond to the different data protocols comprises receiving bytes of building performance data values, generating multiple machine states corresponding to the bytes of received performance data values. In some embodiments, each of the machine states comprises a lifetime corresponding to a single event from the bytes of building performance data values. Some embodiments include generating packets of structured IoT data that correspond to the machine states and generating structured queries corresponding to the packets, the structured queries comprising query and reply operations.

In some embodiments, receiving sensor values from the IoT network comprises performing a bandwidth and connectivity analysis corresponding to received sensor value data and performing a common language interpretation on received sensor value data and associating common language terms with ones of the received sensor values.

Some embodiments provide that the database comprises a time series database and a key/value database and aggregating the received building performance data from the different building performance data sources into a single data stream comprises generating a timeline corresponding to received building performance sensor values and errors, communicating with the time series database to generate a timeline corresponding to updated sensor values, updating event documents and storing updated event documents in the key/value database, wherein the key/value database comprises unique identifiers corresponding to updated event documents, and sending the single stream that includes the updated event documents and the timeline of sensor values to a consumer.

Some embodiments of the present inventive concept are directed to computer program products that include a tangible computer readable storage medium comprising computer readable program code embodied in the medium that when executed by at least one processor causes the at least one processor to perform operations described herein. Operations include receiving building performance data from multiple different building performance data sources each comprising one of multiple different system programming languages and configured to provide building performance data at different time intervals. In some embodiments, the receiving comprises sending, to an IoT network, multiple requests for sensor values from the building performance sensors by querying different ones of the building performance sensors at different rates based on predefined priorities corresponding to different ones of the building performance sensors and receiving sensor values corresponding to multiple building performance sensors that are communicatively coupled via an Internet of Things (IoT) network, aggregating the received building performance data from the different building performance data sources into a single data stream that includes sensor values, error messages and updates, sending, to an analytics and scripting server that is operable to manage a session, session information that includes schedules for running multiple scripts that are designated to be executed at different times and session state information corresponding to an active web session.

Operations may further include receiving, from the analytics and scripting server, updates corresponding to the session state information of the active web session, providing a digital representation of the IoT network that includes the different building performance data sources. In some embodiments, the digital representation comprises an event-sourced algorithm and is based on an event stream that provides information corresponding to retrospective state conditions of the database that corresponds to a previously occurring point in time. Operations may include storing the digital representation in the database, generating graphical data that represents data in the single data stream, and displaying the graphical data to a user.

In some embodiments, receiving, from the IoT network and in the single stream, sensor values from the building performance sensors that are protocol specific and that correspond to the plurality of different data protocols comprises receiving bytes of building performance data values and generating multiple machine states corresponding to the bytes of received performance data values. In some embodiments, each of the machine states comprises a lifetime corresponding to a single event from the bytes of building performance data values. Operations may include generating packets of structured IoT data that correspond to the machine states and generating structured queries corresponding to the packets, the structured queries comprising query and reply operations.

In some embodiments, receiving sensor values from the IoT network comprises performing a bandwidth and connectivity analysis corresponding to received sensor value data and performing a common language interpretation on received sensor value data and associating common language terms with ones of the received sensor values.

Some embodiments of the present inventive concept are directed to a server that includes a processing circuit, a memory that includes machine-readable code that, when executed, cause the processing circuit to perform operations including receiving building performance data from multiple different building performance data sources each configured to provide building performance data at different time intervals, the receiving comprising sending, to an IoT network, multiple requests for sensor values from the building performance sensors by querying different ones of the building performance sensors at different rates based on predefined priorities corresponding to different ones of the building performance sensors and receiving sensor values corresponding to the building performance sensors that are communicatively coupled via an Internet of Things (IoT) network. Operations may include aggregating the received building performance data from the different building performance data sources into a single data stream that includes sensor values, error messages and updates, sending, to an analytics and scripting server that is operable to manage a session, session information that includes schedules for running multiple scripts that are designated to be executed at different times and session state information corresponding to an active web session, receiving, from the analytics and scripting server, updates corresponding to the session state information of the active web session, and providing a digital representation of the IoT network that includes the different building performance data sources In some embodiments, the digital representation comprises an event-sourced algorithm and is based on an event stream that provides information corresponding to a retrospective state condition of the database that corresponds to a previously occurring point in time. Operations may include storing the digital representation in the database, generating graphical data that represents data in the single data stream, and displaying the graphical data to a user. Some embodiments provide that sending, to the IoT network, the requests for sensor values from the building performance sensors comprises querying different ones of the building performance sensors at different rates based on predefined priorities corresponding to different ones of the building performance sensors, the different rates comprising different sampling intervals. In some embodiments, a first portion of the building performance sensors comprises a first priority and a second portion of the building performance sensors comprises a second priority that is different from the first priority. Some embodiments provide that querying different ones of the building performance sensors at different rates comprises querying the first portion of the building sensors at a first rate and querying the second portion of the building performance sensors at a second rate that is different from the first rate.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s).

DETAILED DESCRIPTION

Figure 1:
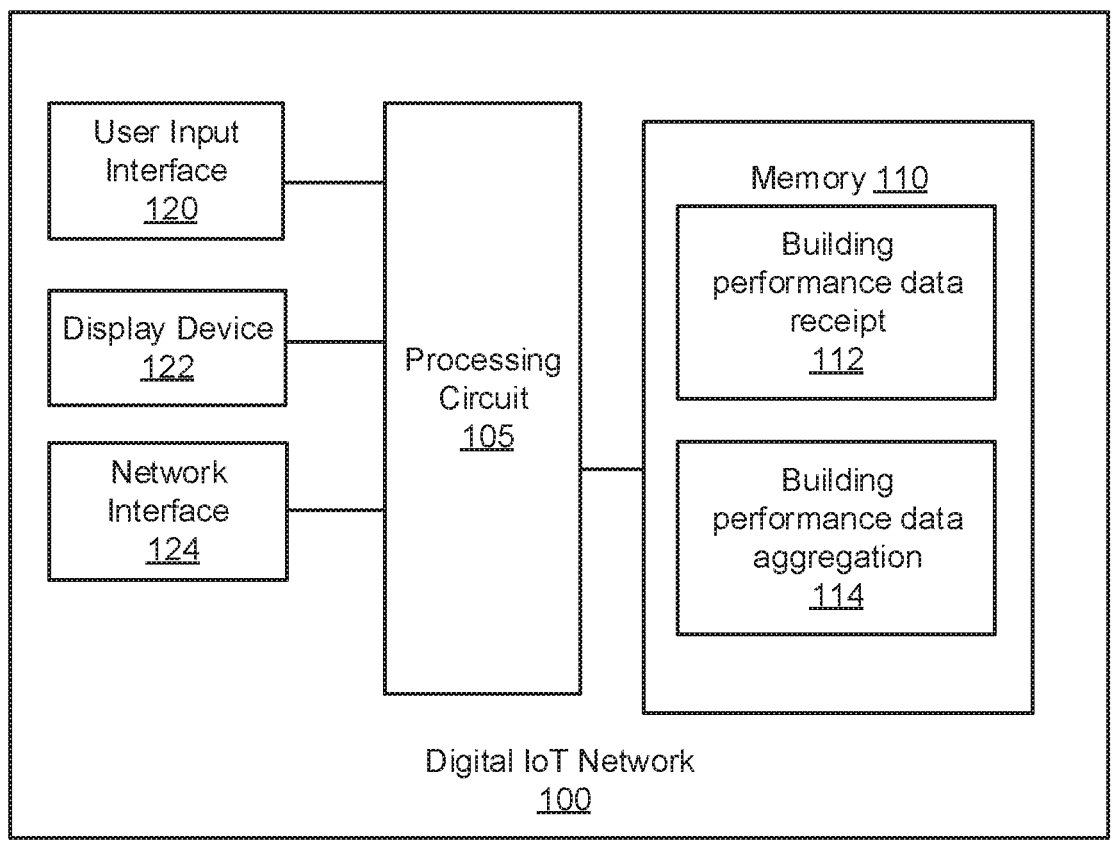
FIG. 1 is a block diagram of a computing system which can be configured as digital IoT network server according to some embodiments of the inventive concepts.

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages such as DART and JAVA script. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

Reference is now made to FIG. 1, which is a block diagram of a computing system which can be configured as digital IoT network server according to some embodiments of the inventive concepts. The digital IoT network server 100 includes a processing circuit 105, a memory 110, and a network interface 124, which may include a radio access transceiver and/or a wired network interface (e.g., Ethernet interface).

The processing circuit 105 may include one or more data processing circuits, such as a general purpose and/or special purpose processor (e.g., microprocessor and/or digital signal processor) that may be collocated or distributed across one or more networks. The processing circuit 105 is configured to execute computer program code in the memory 110, described below as a non-transitory computer readable medium, to perform at least some of the operations described herein. The server may further include a user input interface 120 (e.g., touch screen, keyboard, keypad, etc.) and a display device 122.

The memory 110 includes computer readable code that configures the digital IoT network server 100 to implement data collection aggregation and dissemination. In particular, the memory 110 includes building performance data receipt code 112 that configures the digital IoT network server 100 to receive building performance data according to the methods described above and building performance data aggregation code 114 that configures the network management server to aggregate the building performance data as described herein.

Figure 2:
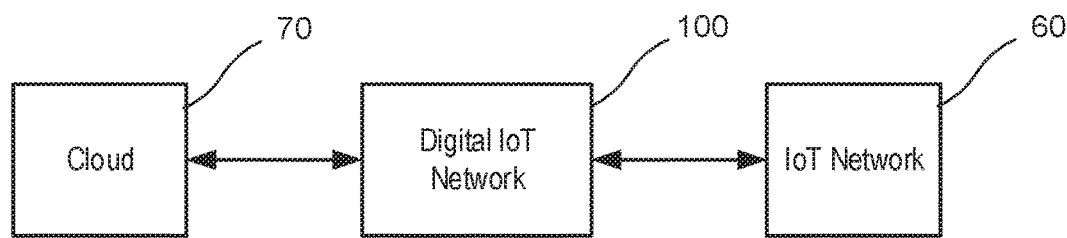
FIG. 2 is a block diagram illustrating a digital IoT network for providing building performance information according to some embodiments of the inventive concepts.

Reference is now made to FIG. 2, is a block diagram illustrating a digital IoT network for providing building performance information according to some embodiments of the inventive concepts. According to some embodiments, a digital IoT network 100 is configured to implement data collection, aggregation and dissemination. In particular, data collection may be performed by the digital IoT network server 100 receiving building performance data from devices that may generally be described as an IoT network 60. The building performance data may include multiple different data streams that are substantially dis-similar and may be aggregated to provide data in fewer data streams, such as a single data stream in some embodiments. The aggregated building performance data may be provided to users that may be communicatively coupled via a cloud-based computing platform 70, which provides network connectivity using one or more virtual and/or physical network resources and/or servers.

Figure 3:
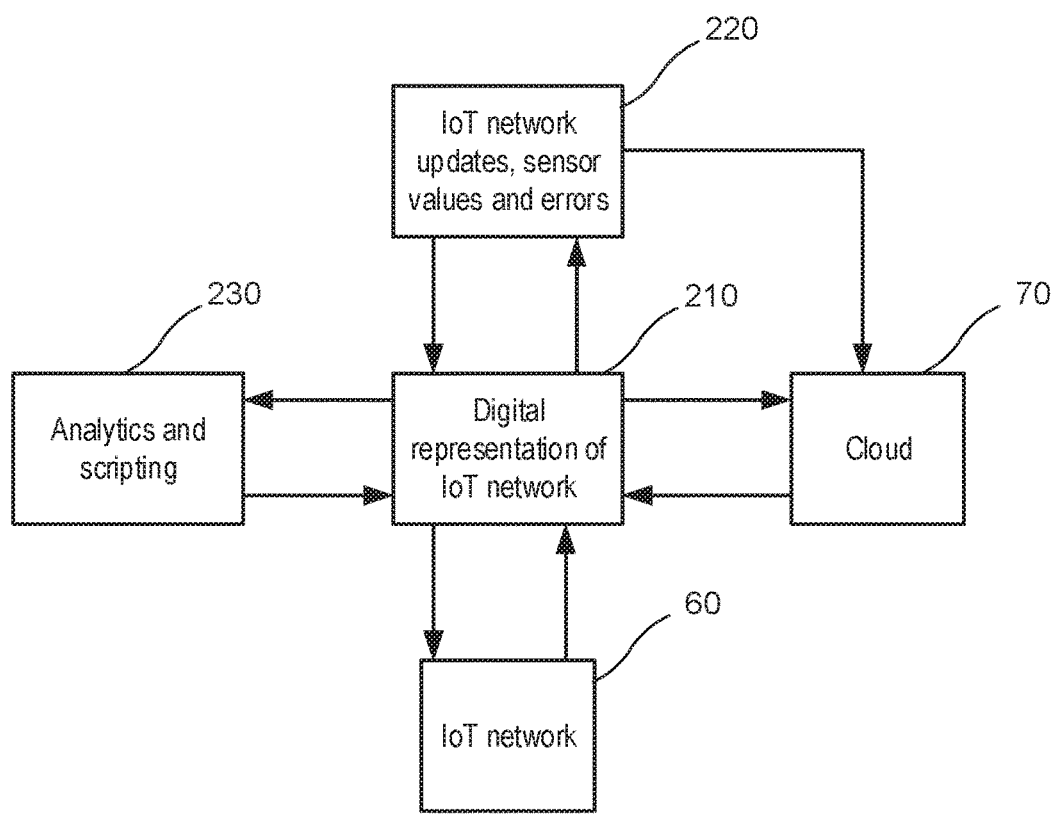
FIG. 3 is a block diagram illustrating a digital IoT network for providing building performance information according to some embodiments of the inventive concepts.

Reference is now made to FIG. 3 is a block diagram illustrating a digital IoT network for providing building performance information according to some embodiments of the inventive concepts. Some embodiments provide that an analytics and scripting module 230 may be configured to receive session information from a digital representation of the IoT network 210. In some embodiments, the analytics and scripting module 230 may manage a session in a manner that is similar to the session being a webpage. The analytics and scripting module (block 230) may receive session information that may include schedules for different scripts, session state information, and/or query information among others. Some embodiments provide that the analytics and scripting module (block 230) may send update data corresponding to the session information. The session information may be provided using reactive piping in which the data pipeline may be event driven versus process driven.

The IoT network updates, sensor values and errors module 220 may be operable to provide sensor data, errors and updates regarding the data that sensors are reporting to the digital representation of the IoT network 210. Some embodiments provide that requests for data from the IoT network updates, sensor values and errors module may be protocol specific based on the different sources and/or types of sources of the building performance data. Some embodiments provide that the IoT network updates, sensor values and errors module reports any building performance data that is recorded and any errors encountered in the process of obtaining the data. This data may be used to generate a single data stream so the data may be accessed as a complete data set thereof. In some embodiments, the IoT network updates, sensor values and errors module 220 may receive protocol specific data and/or data requests.

In some embodiments, IoT network updates, sensor values and errors module 220 may send sensor values to the cloud for data trending operations.

Some embodiments provide that the digital representation of the IoT network 210 includes a document having a format that is compatible with asynchronous browser-server communication and a data stream of all updates that have occurred since the document was created and/or generated. The digital representation of the IoT network 210 may include an event sourced algorithm so the data may be rolled back to view the past states of the system at given points in time. Some embodiments provide that the digital representation of the IoT network 210 may be hierarchical and may include one or more acyclic graphs corresponding to the data representation. In some embodiments, changes to graphs may be tracked internally to provide an audit trail thereof.

Figure 4:
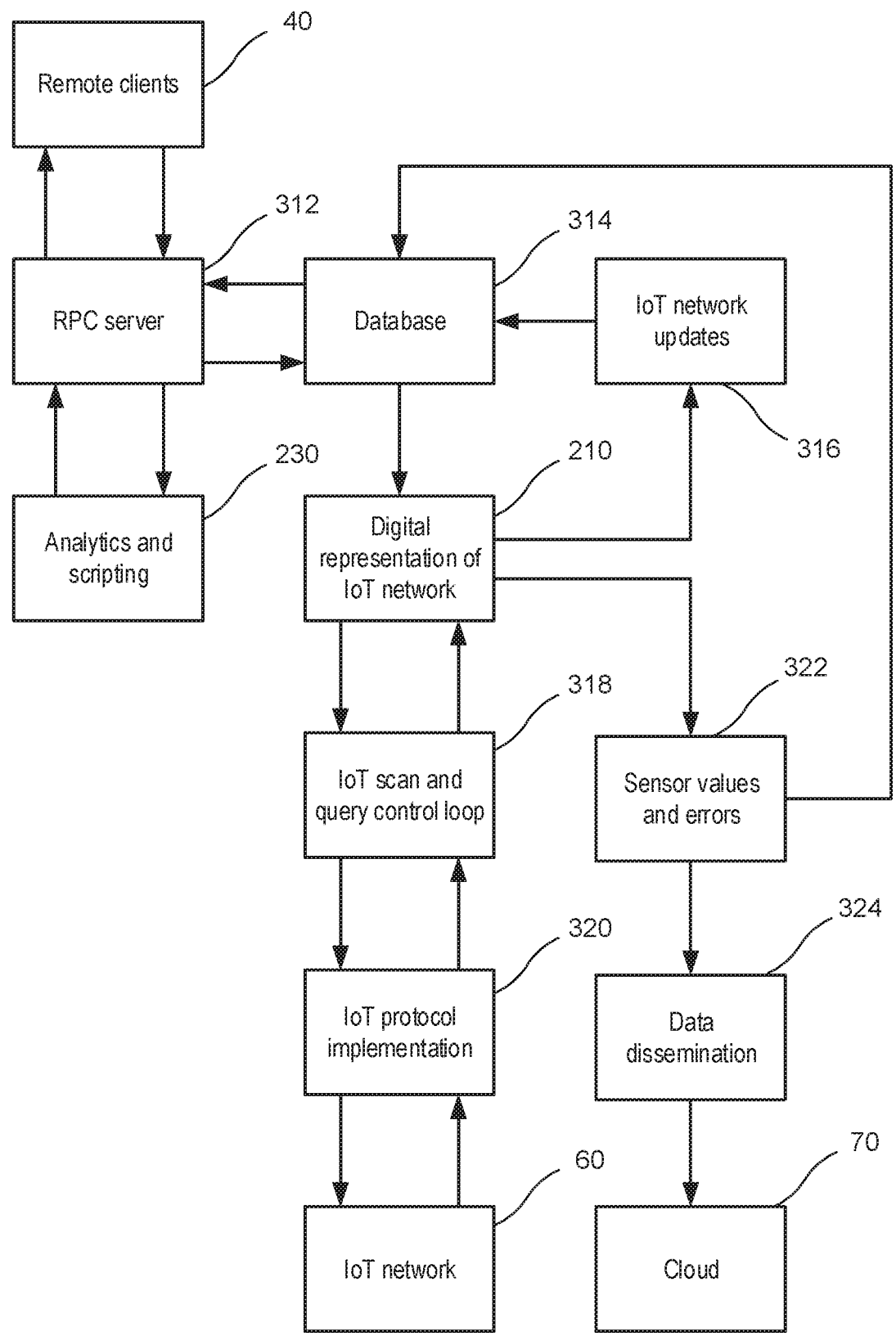
FIG. 4 is a block diagram illustrating a digital IoT network for providing building performance information according to some embodiments of the inventive concepts.

Reference is now made to FIG. 4, which is a block diagram illustrating a digital IoT network for providing building performance information according to some embodiments of the inventive concepts. In some embodiments, analytics and scripting 230 may interface with the digital representation of the IoT network 210 using a remote procedure call (RPC) server 312 that includes communications with remote clients 40. In some embodiments, the RPC server 312 may communicate with that is configured to provide values to the digital representation of IoT network 210. In some embodiments, the RPC server 312 may include a set of commands that may be used remotely to provide an interface for remote clients. The database 314 may be updated with IoT network updates 316 the may be provided by the digital representation of IoT network 210. In some embodiments the RPC server 312 and remote clients 40 may interact with the database 314 via a data buffer (not illustrated).

In some embodiments, the digital representation of IoT network 210 may access the IoT network 60 by implementing an IoT scan inquiry control loop 318 and by implementing the appropriate IoT protocol 320. In some embodiments, different data sources may be queried at different rates based on factors including the exigency of the data and/or the availability of the data. The digital representation of the IoT network 210 may generate the sensor values and errors 322 and perform a data dissemination 324 for providing the data to the cloud 70. As used herein, data dissemination may include any information that is sent to the cloud 70 and/or that is sent to consumers accessing the system by the cloud 70. In some embodiments, the cloud 70 may act as a remote client for web users. Some embodiments provide that sensor values and errors 322 may further be sent to the database 314 for updating the values therein.

Figure 5:
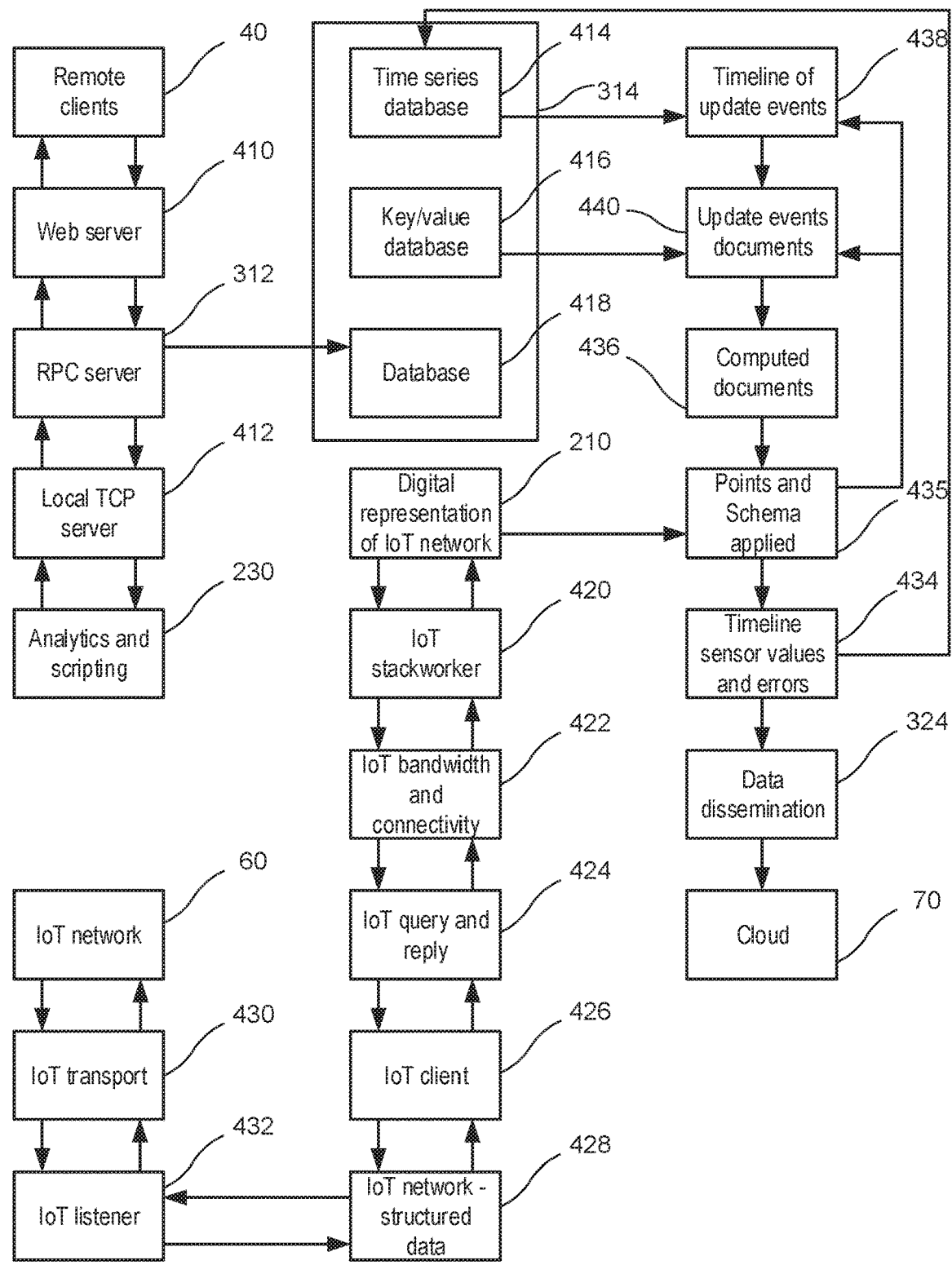
FIG. 5 is a block diagram illustrating a digital IoT network for providing building performance information according to some embodiments of the inventive concepts.

Reference is now made to FIG. 5, which is a block diagram illustrating a digital IoT network for providing building performance information according to some embodiments of the inventive concepts. Some embodiments provide that an IoT network 60 may include multiple different sensors for detecting and gathering building performance data. In some embodiments, an IoT transport 430 may provide a level of abstraction corresponding to bytes of data. An IoT listener 432 may use the data to generate state machines that set up different talk and listening requests. Such requests may be created and exist for the lifetime of the communication, after which they may be dissolved and recreated again if needed. This may provide the pipeline of the asynchronous engine which allows us to layer all of these requests at the same time.

Referring to the IoT network structured data 428, the state machine data may be converted into data packets and then as devices that the IoT client 426 and as structured queries at the IoT query and reply 424. Some embodiments provide that structured queries are an aspect that allows us to interface between the IoT implementation and being up to control when we query points and one levels.

The IoT bandwidth and conductivity 422 provides a measure of the speed of information because between the digital representation of IRT network 210 and the IRT network 60. In some embodiments this information may be beneficial in determining how fast future information should return and/or the rate at which we should query for future information. Some embodiments provide that this is an active process it may be dynamically performed. The IoT stack worker 420 may provide an interface between the representation of the IoT network and the beginning of the implementation of an implementation-specific IoT protocol. In this manner, the digital representation of IoT network 210 may use a single protocol while the IoT network operations may use many different protocols.

From the digital representation of IoT network 210, a points and schema may be applied 435. In some embodiments the points may be generic and/or may be specific to a given implementation. Some embodiments provide that the combination of a particular class and a program may be applied as a schema. A timeline of update events module 438 may store all of the time series event history and all of the error history in the time series database 414. The update events documents module 440 stores all the changes to all the documents. In some embodiments, the changes may be stored as unique identifiers which may be used to recall the contents and/or properties of the change. In such embodiments, the actual change may be stored in a key/value database 416. The documents may be computed 436 to include updates of events and/or timelines.

The timeline sensor values 434 may push down into data dissemination 324 and ultimately delivered via the cloud 70. In some embodiments the cloud 70 may further include functionality to distribute the data to the ultimate data consumer.

Figure 6:
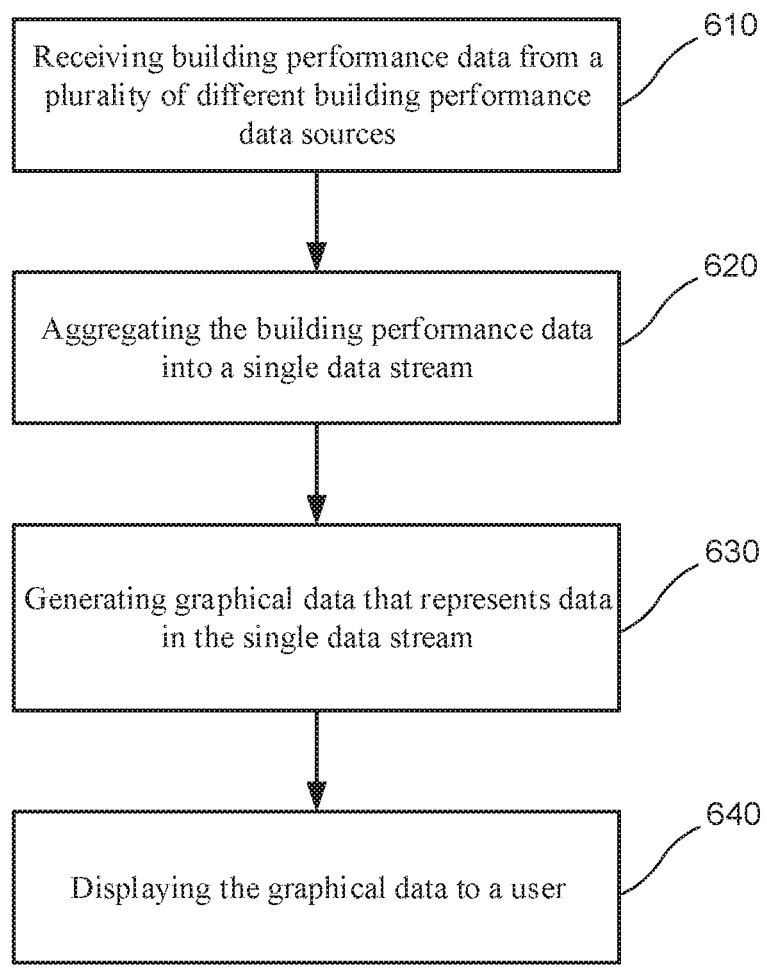
FIG. 6 is a flow chart illustrating operations for system, methods and processing circuits to perform for providing building performance information according to some embodiments of the present inventive concept.

Reference is now made to FIG. 6, which is a flow chart illustrating operations for system, methods and/or processing circuits to perform for providing building performance information according to some embodiments of the present inventive concept. Operations include receiving building performance data from multiple of different building performance data sources (block 610). In some embodiments, each of the building performance data source may include a different system programming language and may be configured to provide building performance data at different time intervals. In some embodiments, the building performance data may be received using a plurality of different data and/or communication protocols. Some embodiments provide that the different time intervals correspond to different priorities corresponding to the different data sources and/or types.

Some embodiments include aggregating the received building performance data from the different building performance data sources into a single data stream (block 620). The single data stream corresponding to the building performance data from the multiple different data sources and/or types thereof may use a single data and/or communication protocol. In some embodiments, the single data and/or communication protocol may be one of the protocols used by one or more of the different data sources and/or types or may be different from any of the protocols used by the different data sources.

Some embodiments include generating graphical data that represents data in the single data stream (block 630) and displaying the graphical data to a user (block). Some embodiments provide that the data may be further sent to a third party consumer that may perform other functions corresponding to the data, such as, for example, predictive model based analytics. In some embodiments, methods and/or systems herein may be operable to automatically cause an event to occur in response to one or more of the events in the single data stream. Example events may include generating an alarm and/or causing an alarm system to activate annunciators and/or other alert hardware. Events may include shutting down or deactivating one or more building system functions and/or systems.

Figure 7:
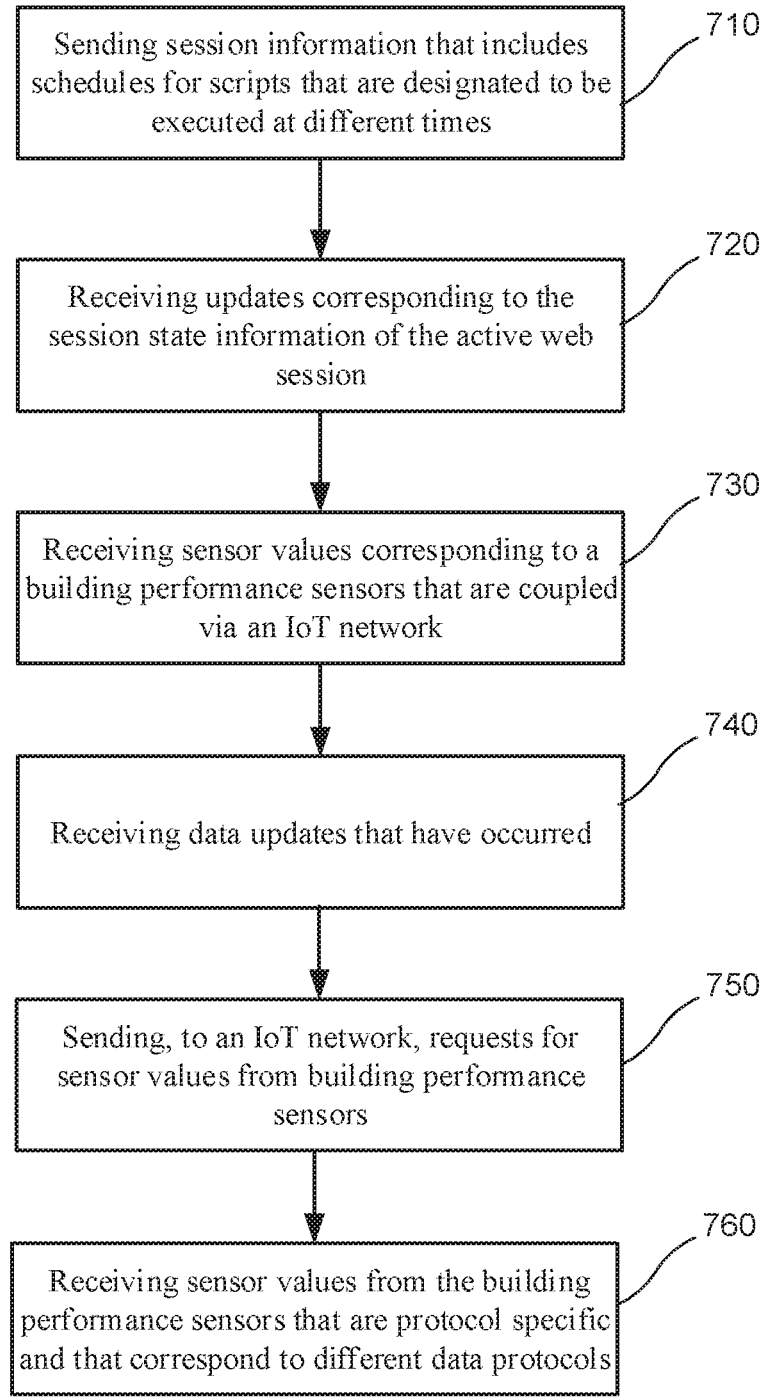
FIG. 7 is a flow chart illustrating operations for system, methods and processing circuits to perform for receiving building performance data as provided in FIG. 6.

Reference is now made to FIG. 7, which is a flow chart illustrating operations for system, methods and processing circuits to perform for receiving building performance data as provided in FIG. 6. According to some embodiments, receiving building performance data may include sending, to an analytics and scripting server that is operable to manage a session, session information that includes schedules for running multiple scripts that are designated to be executed at different times (block 710). In some embodiments, session information may also include session state information corresponding to an active web session. In some embodiments, operations for receiving building performance data may include receiving, from the analytics and scripting server, updates corresponding to the session state information of the active web session (block 720).

Some embodiments of receiving building performance data further include receiving sensor values corresponding to multiple building performance sensors that are communicatively coupled via an Internet of Things (IoT) network (block 730). In some embodiments, operations further include receiving error messages corresponding to ones of the building performance sensors.

Some embodiments provide that receiving building performance data further includes receiving data updates that have occurred (block 740). In some embodiments, the sensor values, the error messages and/or the updates are received in one or more data streams.

Some embodiments further include providing a digital representation of an IoT network that includes the different building performance data sources. The digital representation may be stored in a database that may include a virtual database that may be hosted on one or more virtual servers.

Some embodiments provide that receiving building performance data includes sending, to an IoT network, multiple requests for sensor values from multiple building performance sensors (block 750). In some embodiments, the requests may correspond to multiple different data protocols. In response to sending the requests, embodiments may include receiving, from the IoT network and in a single stream, sensor values from the building performance sensors that are protocol specific and that correspond to the different data protocols (block 760).

In some embodiments, the digital representation of the IoT network includes an event-sourced algorithm and is based on an event stream that provides information corresponding to retrospective state conditions of the database that corresponds to a previously occurring point in time. For example, past states of the digital representation of the IoT network may be determined by performing a lookback based on the time series of the event stream. In some embodiments, the digital representation is hierarchical and is configured to include one or more acyclic graphs therein.

Some embodiments provide that the analytics and scripting server communicates with the database via a remote procedure call (RPC) server. In some embodiments, the RPC server may be configured to receive queries and send the graphical data in the single data stream to a remote client. The remote client may include users and/or customers that may use the building performance data to manage building operations and/or determine current and/or future capacities and/or growth challenges. Remote clients may be physically remote and/or may be remote in the context of the building performance data system operations.

In some embodiments, sending, to the IoT network, the requests for sensor values from the building performance sensors includes querying different ones of the building performance sensors at different rates based on predefined priorities corresponding to different ones of the building performance sensors. Some embodiments provide that the different rates comprise different sampling intervals.

Some embodiments provide that a first portion of the building performance sensors have a first priority and a second portion of the building performance sensors have a second priority that is different from the first priority. In some embodiments, querying different ones of the building performance sensors at different rates includes querying the first portion of the building sensors at a first rate and querying the second portion of the building performance sensors at a second rate that is different from the first rate. Although discussed in terms of first and second portions, embodiments herein may include more than two different portions of the building sensors that may be queried at more than two different respective rates.

In some embodiments, sending the requests for sensor values and receiving the sensor values is performed using an IoT-specific protocol. Some embodiments provide that receiving, from the IoT network and in the single stream, sensor values from the building performance sensors that are protocol specific and that correspond to the different data protocols includes receiving bytes of building performance data values, generating multiple machine states corresponding to the bytes of received performance data values. In some embodiments, each of the machine states includes a lifetime corresponding to a single event from the bytes of building performance data values. Some embodiments provide that operations may further include generating packets of structures of IoT data that correspond to the machine states and generating structured queries corresponding to the packets. The structured queries may include query and reply operations.

Some embodiments provide that receiving sensor values from the IoT network includes performing a bandwidth and connectivity analysis corresponding to received sensor value data and performing a common language interpretation on received sensor value data and associating common language terms with ones of the received sensor values. In some embodiments, the database includes a time series database and a key/value database. Aggregating the received building performance data from the different building performance data sources into a single data stream includes generating a timeline corresponding to received building performance sensor values and errors, communicating with the time series database to generate a timeline corresponding to updated sensor values, updating event documents and storing updated event documents in the key/value database, wherein the key/value database includes unique identifiers corresponding to updated event documents, and sending the single stream that includes the updated event documents and the timeline of sensor values to a consumer.

Figure 8:
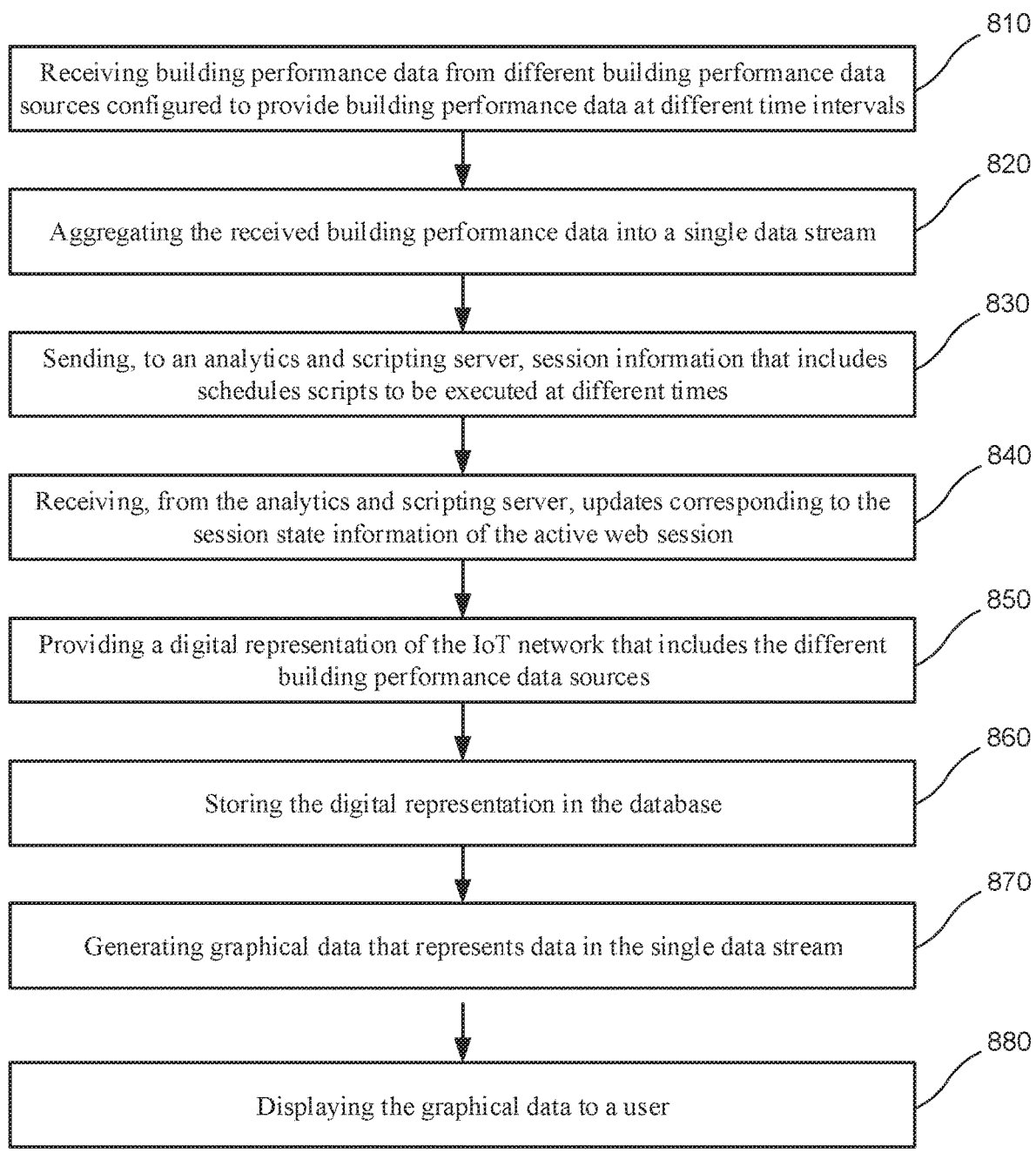
FIG. 8 is a flow chart illustrating operations for system, methods and processing circuits to perform for providing building performance information according to some embodiments of the present inventive concept.

Reference is now made to FIG. 8, which is a flow chart illustrating operations for system, methods and processing circuits to perform for providing building performance information according to some embodiments of the present inventive concept. In some embodiments, a computer program product may include a tangible computer readable storage medium comprising computer readable program code embodied in the medium that when executed by at least one processor causes the at least one processor to perform operations described herein.

Operations may include receiving building performance data from multiple different building performance data sources (block 810). Each of the building performance data sources may include one of multiple different system programming languages and/or IoT protocols and may be configured to provide building performance data at different time intervals. In some embodiments, receiving further includes sending, to an IoT network, multiple requests for sensor values from the building performance sensors by querying different ones of the building performance sensors at different rates based on predefined priorities corresponding to different ones of the building performance sensors and receiving sensor values corresponding to building performance sensors that are communicatively coupled via an Internet of Things (IoT) network.

In some embodiments, receiving, from the IoT network and in the single stream, sensor values from the building performance sensors that are protocol specific and that correspond to the different data protocols includes receiving bytes of building performance data values and generating multiple machine states corresponding to the bytes of received performance data values. In some embodiments, each of the machine states includes a lifetime corresponding to a single event from the bytes of building performance data values. Packets of structures of IoT data may be generated and may correspond to the machine states. Structured queries corresponding to the packets may be generated. The structured queries include query and reply operations.

Some embodiments provide that receiving sensor values from the IoT network includes performing a bandwidth and connectivity analysis corresponding to received sensor value data and performing a common language interpretation on received sensor value data and associating common language terms with ones of the received sensor values.

Some embodiments provide operations may include aggregating the received building performance data from the different building performance data sources into a single data stream that includes sensor values, error messages and updates (block 820). Operations may further include sending, to an analytics and scripting server that is operable to manage a session, session information that includes schedules for running multiple scripts that are designated to be executed at different times and session state information corresponding to an active web session (block 830).

Some embodiments include receiving, from the analytics and scripting server, updates corresponding to the session state information of the active web session (840) and providing a digital representation of the IoT network that includes the different building performance data sources (block 850). In some embodiments, the digital representation includes an event-sourced algorithm and is based on an event stream that provides information corresponding to retrospective state conditions of the database that corresponds to a previously occurring point in time. Operations may include storing the digital representation in the database (block 860), generating graphical data that represents data in the single data stream (block 870), and displaying the graphical data to a user (block 880).

In the drawings and specification, there have been disclosed typical embodiments and, although specific terms are employed, they are used in a generic and descriptive sense only and not for purposes of limitation, the scope of the invention being set forth in the following claims.

What is claimed is:

1. A computer implemented method of providing building performance data, the method comprising:
   receiving building performance data from a plurality of different building performance data sources each comprising one of a plurality of different system programming languages and/or protocols and configured to provide building performance data at different time intervals;
   aggregating the received building performance data from the plurality of different building performance data sources into a single data stream;
   generating graphical data that represents data in the single data stream; and
   providing the data in the single data stream and/or the graphical data to be displayed data to a user,
   wherein receiving building performance data comprises:
   sending, to an analytics and scripting server that is operable to manage a session, session information that includes schedules for running a plurality of scripts that are designated to be executed at different times and session state information corresponding to an active web session; and
   receiving, from the analytics and scripting server, updates corresponding to the session state information of the active web session.

2. The method of claim 1, wherein receiving building performance data comprises:
   receiving sensor values corresponding to a plurality of building performance sensors that are communicatively coupled via an Internet of Things (IoT) network; and
   receiving error messages corresponding to ones of the plurality of building performance sensors.

3. The method of claim 2, wherein receiving building performance data further comprises receiving data updates that have occurred, and
   wherein the sensor values, the error messages and the updates are received in a data stream.

4. The method of claim 3, further comprising:
   providing a digital representation of an IoT network that includes the plurality of different building performance data sources; and
   storing the digital representation in a database,
   wherein the database comprises a virtual database that is hosted on one or more virtual servers.

5. The method of claim 4, wherein receiving building performance data comprises:
   sending, to an IoT network, a plurality of requests for sensor values from a plurality of building performance sensors, wherein the plurality of requests corresponds to a plurality of different data protocols; and
   responsive to sending the plurality of requests, receiving, from the IoT network and in a single stream, sensor values from the plurality of building performance sensors that are protocol specific and that correspond to the plurality of different data protocols.

6. The method of claim 5, wherein the digital representation comprises an event-sourced algorithm and is based on an event stream that provides information corresponding to retrospective state conditions of the database that corresponds to a previously occurring point in time.

7. The method of claim 5, wherein the digital representation is hierarchical and is configured to include one or more acyclic graphs therein.

8. The method of claim 5, wherein the analytics and scripting server communicates with the database via a remote procedure call (RPC) server, and
wherein the RPC server is further configured to receive queries and send the graphical data in the single data stream to a remote client.

9. The method of claim 5, wherein sending, to the IoT network, the plurality of requests for sensor values from the plurality of building performance sensors comprises querying different ones of the plurality of building performance sensors at different rates based on predefined priorities corresponding to different ones of the plurality of building performance sensors, the different rates comprising different sampling intervals.

10. The method of claim 9, wherein a first portion of the plurality of building performance sensors comprises a first priority and a second portion of the plurality of building performance sensors comprises a second priority that is different from the first priority, and
wherein querying different ones of the plurality of building performance sensors at different rates comprises querying the first portion of the plurality of building sensors at a first rate and querying the second portion of the plurality of building performance sensors at a second rate that is different from the first rate.

11. The method of claim 5, wherein sending, to the IoT network, the plurality of requests for sensor values and receiving, from the IoT network the sensor values comprises using an IoT-specific protocol.

12. The method of claim 5, wherein receiving, from the IoT network and in the single stream, sensor values from the plurality of building performance sensors that are protocol specific and that correspond to the plurality of different data protocols comprises:
receiving bytes of building performance data values;
generating a plurality of machine states corresponding to the bytes of received performance data values, wherein each of the plurality of machine states comprises a lifetime corresponding to a single event from the bytes of building performance data values;
generating packets of structured IoT data that correspond to the plurality of machine states; and
generating structured queries corresponding to the packets, the structured queries comprising query and reply operations.

13. The method of claim 5, wherein receiving sensor values from the IoT network comprises:
performing a bandwidth and connectivity analysis corresponding to received sensor value data; and
performing a common language interpretation on received sensor value data and associating common language terms with ones of the received sensor values.

14. The method of claim 5, wherein the database comprises a time series database and a key/value database, and
wherein aggregating the received building performance data from the plurality of different building performance data sources into a single data stream comprises:
generating a timeline corresponding to received building performance sensor values and errors;
communicating with the time series database to generate a timeline corresponding to updated sensor values;
updating event documents and storing updated event documents in the key/value database, wherein the key/value database comprises unique identifiers corresponding to updated event documents;
sending the single stream that includes the updated event documents and the timeline of sensor values to a consumer.

15. A computer program product, comprising:
a tangible computer readable storage medium comprising computer readable program code embodied in the medium that when executed by at least one processor causes the at least one processor to perform operations comprising:
receiving building performance data from a plurality of different building performance data sources each comprising one of a plurality of different system programming languages and configured to provide building performance data at different time intervals, wherein the receiving comprises sending, to an IoT network, a plurality of requests for sensor values from the plurality of building performance sensors by querying different ones of the plurality of building performance sensors at different rates based on predefined priorities corresponding to different ones of the plurality of building performance sensors and receiving sensor values corresponding to a plurality of building performance sensors that are communicatively coupled via an Internet of Things (IoT) network;
aggregating the received building performance data from the plurality of different building performance data sources into a single data stream that includes sensor values, error messages and updates;
sending, to an analytics and scripting server that is operable to manage a session, session information that includes schedules for running a plurality of scripts that are designated to be executed at different times and session state information corresponding to an active web session;
receiving, from the analytics and scripting server, updates corresponding to the session state information of the active web session;
providing a digital representation of the IoT network that includes the plurality of different building performance data sources, wherein the digital representation comprises an event-sourced algorithm and is based on an event stream that provides information corresponding to retrospective state conditions of the database that corresponds to a previously occurring point in time;
storing the digital representation in the database;
generating graphical data that represents data in the single data stream; and
providing the data in the single data stream and/or the graphical data to be displayed data to a user.

16. The computer program product of claim 15, wherein receiving, from the IoT network and in the single stream, sensor values from the plurality of building performance sensors that are protocol specific and that correspond to the plurality of different data protocols comprises:
receiving bytes of building performance data values;
generating a plurality of machine states corresponding to the bytes of received performance data values, wherein each of the plurality of machine states comprises a lifetime corresponding to a single event from the bytes of building performance data values;
generating packets of structured IoT data that correspond to the plurality of machine states; and generating structured queries corresponding to the packets, the structured queries comprising query and reply operations.

17. The computer program product of claim 15, wherein receiving sensor values from the IoT network comprises:
performing a bandwidth and connectivity analysis corresponding to received sensor value data; and
performing a common language interpretation on received sensor value data and associating common language terms with ones of the received sensor values.

18. A server comprising:
a processing circuit;
a memory that includes machine-readable code that, when executed, cause the processing circuit to perform the following operations:
receiving building performance data from a plurality of different building performance data sources each configured to provide building performance data at different time intervals, the receiving comprising sending, to an IoT network, a plurality of requests for sensor values from the plurality of building performance sensors by querying different ones of the plurality of building performance sensors at different rates based on predefined priorities corresponding to different ones of the plurality of building performance sensors and receiving sensor values corresponding to the plurality of building performance sensors that are communicatively coupled via an Internet of Things (IoT) network;
aggregating the received building performance data from the plurality of different building performance data sources into a single data stream that includes sensor values, error messages and updates;
sending, to an analytics and scripting server that is operable to manage a session, session information that includes schedules for running a plurality of scripts that are designated to be executed at different times and session state information corresponding to an active web session;
receiving, from the analytics and scripting server, updates corresponding to the session state information of the active web session;
providing a digital representation of the IoT network that includes the plurality of different building performance data sources, wherein the digital representation comprises an event-sourced algorithm and is based on an event stream that provides information corresponding to a retrospective state condition of the database that corresponds to a previously occurring point in time;
storing the digital representation in the database;
generating graphical data that represents data in the single data stream; and
providing the data in the single data stream and/or the graphical data to be displayed data to a user.

19. The server of claim 18, wherein sending, to the IoT network, the plurality of requests for sensor values from the plurality of building performance sensors comprises querying different ones of the plurality of building performance sensors at different rates based on predefined priorities corresponding to different ones of the plurality of building performance sensors, the different rates comprising different sampling intervals,
wherein a first portion of the plurality of building performance sensors comprises a first priority and a second portion of the plurality of building performance sensors comprises a second priority that is different from the first priority, and
wherein querying different ones of the plurality of building performance sensors at different rates comprises querying the first portion of the plurality of building sensors at a first rate and querying the second portion of the plurality of building performance sensors at a second rate that is different from the first rate.

* * * * *